(12) United States Patent
Kikuchi

(10) Patent No.: US 7,447,986 B2
(45) Date of Patent: Nov. 4, 2008

(54) MULTIMEDIA INFORMATION ENCODING APPARATUS, MULTIMEDIA INFORMATION REPRODUCING APPARATUS, MULTIMEDIA INFORMATION ENCODING PROCESS PROGRAM, MULTIMEDIA INFORMATION REPRODUCING PROCESS PROGRAM, AND MULTIMEDIA ENCODED DATA

(75) Inventor: Takeshi Kikuchi, Hamana-gun (JP)

(73) Assignee: Yamaha Corporation, Shizuoka-Ken (JP)

( * ) Notice: Subject to any disclaimer, the term of this patent is extended or adjusted under 35 U.S.C. 154(b) by 1252 days.

(21) Appl. No.: 10/367,784

(22) Filed: Feb. 19, 2003

(65) Prior Publication Data

US 2003/0161425 A1 Aug. 28, 2003

(30) Foreign Application Priority Data

Feb. 26, 2002 (JP) .............................. 2002-049644

(51) Int. Cl.
*G06F 17/00* (2006.01)
(52) U.S. Cl. .......................... 715/201; 715/203; 84/601
(58) Field of Classification Search ................. 715/203, 715/201; 84/601
See application file for complete search history.

(56) References Cited

U.S. PATENT DOCUMENTS

| | | | |
|---|---|---|---|
| 5,977,468 A | 11/1999 | Fujii | |
| 6,211,974 B1 * | 4/2001 | Haneda | 358/527 |
| 6,429,366 B1 | 8/2002 | Terada | |
| 6,574,655 B1 * | 6/2003 | Libert et al. | 709/200 |
| 6,820,055 B2 * | 11/2004 | Saindon et al. | 704/235 |
| 6,928,060 B1 | 8/2005 | Kikuchi | |
| 2002/0008703 A1 * | 1/2002 | Merrill et al. | 345/473 |
| 2003/0140121 A1 * | 7/2003 | Adams | 709/219 |

FOREIGN PATENT DOCUMENTS

| | | |
|---|---|---|
| JP | 63-301997 | 6/1987 |
| JP | 11-24661 | 6/1997 |
| JP | 11-284588 | 3/1998 |
| JP | 2000-39884 | 7/1998 |

OTHER PUBLICATIONS

Myszkowski, Karol, et al, "Perception-Guided Global Illumination Solution for Animation Rendering", Siggraph '01: Proceedings of the 28th Annual Conference on Computer Graphics and Interactive Techniques, Aug. 2001, pp. 221-230.*
Japanese Office Action with English Translation dated Sep. 19, 2006.

* cited by examiner

*Primary Examiner*—Laurie Ries
(74) *Attorney, Agent, or Firm*—Reed Smith LLP; Stanley P. Fisher, Esq.; Juan Carlos A. Marquez, Esq.

(57) ABSTRACT

There is provided a multimedia information encoding apparatus and a multimedia information reproducing apparatus which enables synchronzied reproduction of multimedia information such as audio data, video data, and text data and performance information such as MIDI data to be easily performed. The multimedia information encoding apparatus creates multimedia encoded data comprising data packets each having a header section that contains information on reproduction timing, and a data section that at least contains information to be reproduced based on performance information including event information. The event information is converted into corresponding text codes, and the text codes obtained by the conversion are stored as script data in the data sections of the data packets that correspond in reproduction timing to the text codes, and multimedia encoded data in which the data sections contain the event information converted into the text codes is created.

8 Claims, 6 Drawing Sheets

| H t=1000 | 5 | "Lyric" | LYRIC "Oh" |

| H t=1200 | 30 | "Lyric" | LYRIC "I" |

| H t=1300 | 50 | "Lyric" | LYRIC "love" |

FIG. 7B

| H t=1000 | 5 | "Lyric" | LYRIC "Oh" | 10 | "MIDI" | ASCII CODE FOR NOTE ON EVENT | 50 | "MIDI" | ASCII CODE FOR NOTE ON EVENT |

| H t=1200 | 20 | "MIDI" | ASCII CODE FOR NOTE OFF EVENT | 30 | "Lyric" | LYRIC "I" |

| H t=1300 | 50 | "Lyric" | LYRIC "love" |

MULTIMEDIA INFORMATION ENCODING APPARATUS, MULTIMEDIA INFORMATION REPRODUCING APPARATUS, MULTIMEDIA INFORMATION ENCODING PROCESS PROGRAM, MULTIMEDIA INFORMATION REPRODUCING PROCESS PROGRAM, AND MULTIMEDIA ENCODED DATA

BACKGROUND OF THE INVENTION

1. Field of the Invention

The present invention relates to a multimedia information encoding apparatus, a multimedia information reproducing apparatus, a multimedia information encoding process program, a multimedia information reproducing process program, and a multimedia encoded data, and in particular, to reproduction of performance information in synchronism with various data such as image data, audio data, and script data.

2. Description of the Related Art

Reproduction of so-called multimedia information has hitherto been known, in which a plurality of types of information of different formats such as audio information and text information are reproduced in synchronism between these types of information. Reproduction of performance information such as MIDI data is also well known.

To reproduce performance information such as MIDI and audio information in synchronism, however, it is necessary to synchronize a MIDI clock with an audio clock. Therefore, synchronized reproduction of the performantion information and the audio information is difficult to perform.

SUMMARY OF THE INVENTION

It is an object of the present invention to provide a multimedia information encoding apparatus and a multimedia information reproducing apparatus which enable synchronzied reproduction of multimedia information such as audio data, video data, and text data and performance information such as MIDI data to be easily performed, as well as a multimedia information encoding process program, a multimedia information reproducing process program, and a multimedia encoded data which are used for these apparatuses.

To attain the above object, in a first aspect of the present invention, there is provided a multimedia information encoding apparatus that creates multimedia encoded data comprising data packets each having a header section that contains information on reproduction timing, and a data section that at least contains information to be reproduced based on performance information including event information, comprising a converter that converts the event information into corresponding text codes, a storage that stores, as script data, the text codes obtained by the conversion in the data sections of the data packets that correspond in reproduction timing to the text codes, and a creater that creates multimedia encoded data in which the data sections contain the event information converted into the text codes.

In the multimedia information encoding apparatus according to the first aspect, it is preferable that when converting the event information into the corresponding text codes, the converter generates information on differential time between a start time point of each of the data packets containing the text codes and the reproduction timing for a corresponding event in the event information, and wherein the storage stores the differential time information in the data section of each of the data packets together with the text code as script data.

In the multimedia information encoding apparatus according to the first aspect, it is also preferable that the performance information includes MIDI information.

In the multimedia information encoding apparatus according to the first aspect, it is also preferable that the converter converts each piece of the event information into a corresponding text code, and the storage stores, as each piece of the script data, the corresponding text code converted from each piece of the event information, in the data section of a corresponding one of the data packets.

In the multimedia information encoding apparatus according to the first aspect, it is also preferable that the script data contains an identifier indicative of the script data being event information.

To attain the above object, in a second aspect of the present invention, there is provided a multimedia information reproducing apparatus that reproduces multimedia encoded data comprising data packets each having a header section that contains information on reproduction timing, and a data section that at least contains, as information to be reproduced, script data based on performance information, comprising a detector that detects text codes representative of the performance information from the script data, a converter that converts the detected text codes into the performance information, and a musical tone generator that generates musical tones based on the converted performance information.

To attain the above object, in a third aspect of the present invention, there is provided a multimedia information encoding process program for causing a computer to execute a process of creating multimedia encoded data comprising data packets each having a header section that contains information on reproduction timing, and a data section that at least information to be reproduced based on performance information including time information and event information, comprising a module for determining data packets corresponding to the time information, a module for converting the event information into corresponding text codes, and a module for storing the text codes obtained by the conversion in the determined data packets as script data.

To attain the above object, in a fourth aspect of the present invention, there is provided a multimedia information reproducing process program for causing a computer to execute a process of reproducing multimedia encoded data comprising data packets each having a header section that contains information on reproduction timing, and a data section that at least contains information to be reproduced based on performance information, comprising a module for detecting a text code representative of the performance information from the data sections of the data packets, a module for converting the detected text codes into corresponding event information, and a module for generating corresponding musical tones based on the event information obtained by the conversion.

To attain the above object, in a fifth aspect of the present invention, there is provided multimedia encoded data comprising data packets each having a header section that contains information on reproduction timing, and a data section that contains information to be reproduced, the data section containing performance information represented by at least a text code.

The above and other objects, features and advantages of the invention will become more apparent from the following detailed description taken in conjunction with the accompanying drawings.

DETAILED DESCRIPTION OF PREFERRED EMBODIMENT

The present invention will be described in detail with reference to the drawings showing an embodiment thereof.

Figure 1:
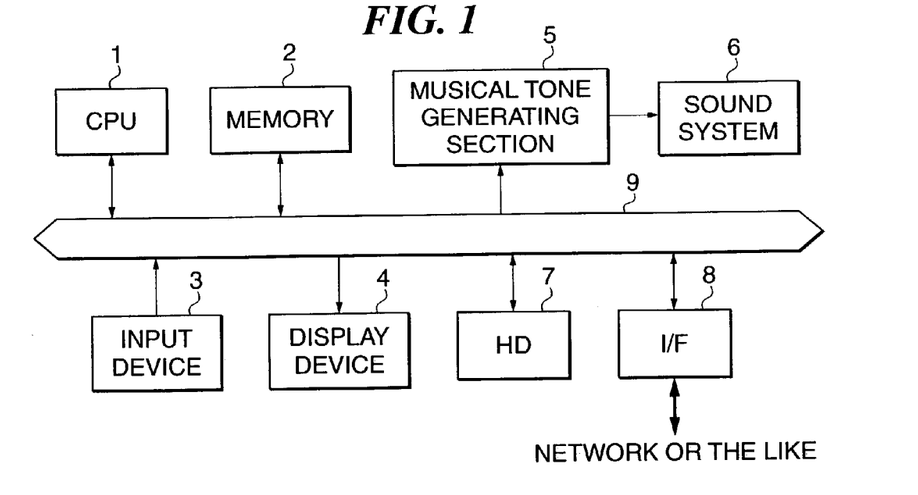
FIG. 1 is a block diagram schematically showing the construction of an apparatus operating as a multimedia information encoding apparatus that executes a multimedia information encoding process program and a multimedia information reproducing apparatus that reproduces multimedia encoded data generated by the multimedia information encoding apparatus, according to an embodiment of the present invention.

FIG. 1 is a block diagram schematically showing the construction of an apparatus operating as a multimedia information encoding apparatus that executes a multimedia information encoding process program and a multimedia information reproducing apparatus that reproduces multimedia encoded data generated by the multimedia information encoding apparatus, according to an embodiment of the present invention.

In FIG. 1, the apparatus is comprised of a central processing unit (CPU) 1 that controls operations of the entire apparatus, a memory 2, an input device 3, a display device 4, a musical tone generator 5, a sound system 6, an external storage device 7 such as a hard disk device which stores various programs, data, and performance information, various I/O interfaces 8, and a bus 9. This apparatus is disposed for connection to external MIDI equipment such as a MIDI instrument or an external network such as the Internet via the I/O interfaces 8.

The components 1 to 9 of the apparatus of the present embodiment are the same as the corresponding components of a general-purpose computer such as a personal computer. The present invention can be realized as software on a computer or as a dedicated apparatus (hardware).

First, with reference to FIG. 2, a conceptual description will be given of a process of reproducing multimedia encoded data according to the present embodiment. Here, it is assumed that video information, audio information, and text information (script information) such as captions and URLs are reproduced in synchronism with each other.

Figure 2:
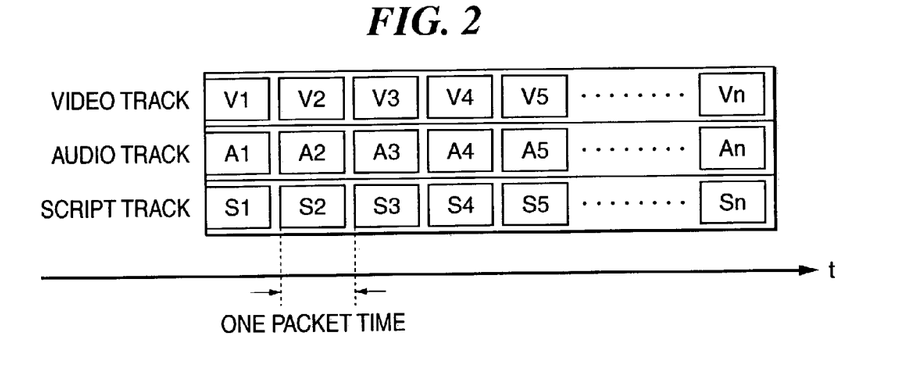
FIG. 2 is a view useful in conceptually explaining a reproducing process executed by the multimedia information reproducing apparatus according to the embodiment to reproduce multimedia encoded data.

As shown in FIG. 2, there are provided a video track in which video information is stored, an audio track in which audio information is stored, and a script track in which text information is stored. Each of these tracks contains packets arranged in a time series manner and each of which retains information to be reproduced for a fixed time (hereinafter referred to as the "packet time"). That is, the video track contains a video packet (video data) V1 retaining video information to be reproduced for one packet time after the start of reproduction, a video packet (video data) V2 retaining video information for the next one packet time, . . . , and a video packet (video data) Vn retaining video information for the last one packet time, the video packets being arranged in this order. The audio track contains an audio packet (audio data) A1 retaining audio information to be reproduced for one packet time after the start of reproduction, an audio packet (audio data) A2 retaining audio information for the next one packet time, . . . , and an audio packet (audio data) An retaining audio information for the last one packet time, the audio packets being arranged in this order. Likewise, the script track contains a script packet (script data) S1 retaining text information or the like to be reproduced for one packet time after the start of reproduction, a script packet (script data) S2 retaining text information or the like for the next one packet time, . . . , and a script packet (script data) Sn retaining text information and the like for the last one packet time, the script packets being arranged in this order. Then, by sequentially reproducing, after the start of reproduction, the packet data (Vk, Ak, and Sk) corresponding to the same packet time in parallel, a plurality of types of data of different formats can be reproduced in a synchronous manner.

In the present invention, performance information (MIDI data such as SMF (Standard MIDI File) data) is encoded into script data to enable the performance information to be reproduced in synchronism with audio information and video information. Lyric data can also be stored as script data in the packets for display.

Figure 3:
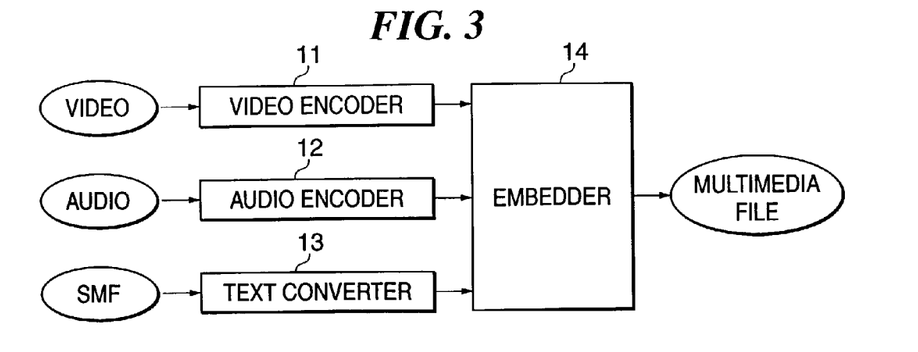
FIG. 3 is a functional block diagram showing an encoding process executed by the multimedia information encoding apparatus according to the embodiment to encode multimedia information.

FIG. 3 is a functional block diagram showing an encoding process executed by the multimedia information encoding apparatus according to the present embodiment to encode multimedia information.

As shown in the figure, a video encoder 11 compresses input video information using a predetermined encoding method (for example, ITU-TH.263 or MPEG-4) and then outputs the compressed information to an embedder 14. An audio encoder 12 compresses input audio information using a predetermined encoding method (for example, MP3 or PCM) and then outputs the compressed information to the embedder 14. A text converter 13 converts performance events contained in MIDI data (performance information) such as SMF data, into text data and then outputs the text data to the embedder 14. The details of this process will be described later.

The embedder 14 synthesizes, for each packet time, data of respective media input by the video encoder 11, audio encoder 12, and text converter 13 as well as text data such as captions and URL data, and then outputs the resulting multimedia file (multimedia encoded data).

Figure 4:
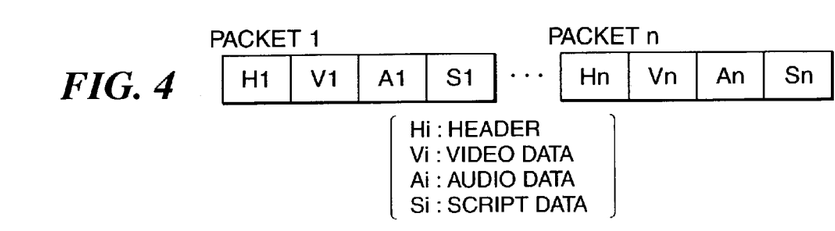
FIG. 4 is a view showing the data structure of multimedia encoded data according to the present invention.

FIG. 4 is a view showing the data structure of multimedia encoded data output from the embebber 14. As shown in the figure, the multimedia encoded data is configured to have a plurality of packets i (i=1 to n) arranged in a time series manner. The i-th packet is comprised of a header (Hi), video data (Vi), audio data (Ai), and script data (Si). Here, the header (Hi) contains packet time information corresponding to the packet. The video data (Vi) contains compressed image information displayed during the packet time. The audio data (Ai) contains compressed audio information reproduced during the packet time. The script data (Si) contains compressed text information displayed during the packet time.

Thus, the multimedia encoded data is comprised of an arrangement of packets each composed of a set of video data, audio data, and script data corresponding to each packet time. When this multimedia encoded data is to be reproduced, the data of the media contained in these packets is separated into data corresponding to respective tracks such as a video track, an audio track, and a script track so as to obtain the format shown in FIG. 2, so that the data in the tracks can be reproduced in synchronism between the tracks.

Next, a description will be given of a process of encoding performance information into script data in packets. In this description, it is assumed that MIDI data in an SMF as performance information is to be encoded.

Figure 5A:
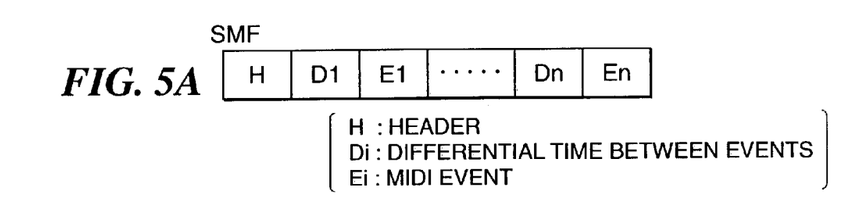
FIG. 5A is a view showing the data structure of SMF data used in an encoding process of encoding performance information into script data in packets.

FIG. 5A is a view showing the data structure of an SMF. As shown in the figure, SMF data is a binary data row composed of a header (H) containing information such as a time unit and data length, and differential time information (Di) indicative of information on the difference in time between MIDI events and MIDI events (Ei) (i=1 to n) that follow the header (H), the differential time information and MIDI events being alternately arranged.

Figure 5B:
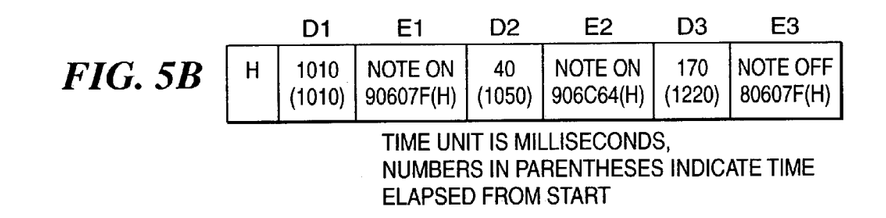
FIG. 5B is a view showing a specific example of SMF data used in the encoding process.

FIG. 5B shows a specific example of SMF data. In this example, the data contains a MIDI event ("90607F(H)", where (H) represents a hexadecimal notation) with D1=1010 milliseconds and E1 as a note-on event of a note C6, a MIDI event ("906C64(H)") with D2=40 milliseconds and E2 as a note-on event of a note C7, and a MIDI event ("80607F(H)") with D3=170 milliseconds and E3 as a note-on event of a note C6. In this case, the unit of time information is milliseconds. The parenthesized numerical values in D1, D2, and D3 in the figure indicate the time elapsed from the start of performance. Further, in "90" of "90607F(H)", 9 denotes a note-on event, and 0 denotes a MIDI channel number 0. The number "60" denotes the note C6, and "7F" denotes velocity. Further, in "906C64(H)", "6C" denotes the note C7. In "80" of "80607F(H)", 8 denotes a note-off event, and 0 denotes the MIDI channel number 0.

As described previously, in the present invention, performance information such as MIDI data is encoded into script data. However, as described previously, the script data is text information composed of text codes such as ASCII codes or JIS codes. Thus, binary data such as SMF data must be converted into text codes such as ASCII codes.

Further, in this case, when the time resolution for packets is high enough for MIDI performance (for example, 1 packet time=approximately 5 milliseconds), a MIDI event (binary data) in the SMF which is to be output during the corresponding time is divided into groups of 4 bits. Then, the groups of 4 bits is converted into corresponding text codes, which is then stored as script data. At this time, an identifier indicative of a MIDI event is also added to the script data. At the same time, an identifier indicative of lyric data to be output or the like can also be added to the script data for saving.

On the other hand, when the time resolution for packets is not high enough for MIDI performance (for example, 1 packet time=approximately 100 milliseconds), differential time information obtained by subtracting the start time of the packet (hereinafter referred to as the "packet time point") from the time at which the MIDI data is output is stored as script data together with text codes into which the MIDI event has been converted, and the script data is reproduced in timing determined by the packet time and the differential time information. This enables the MIDI performance to be accurately reproduced.

Alternatively, MIDI event data in the form of text data and identifiers may be encoded or compressed before storage.

Figure 6:
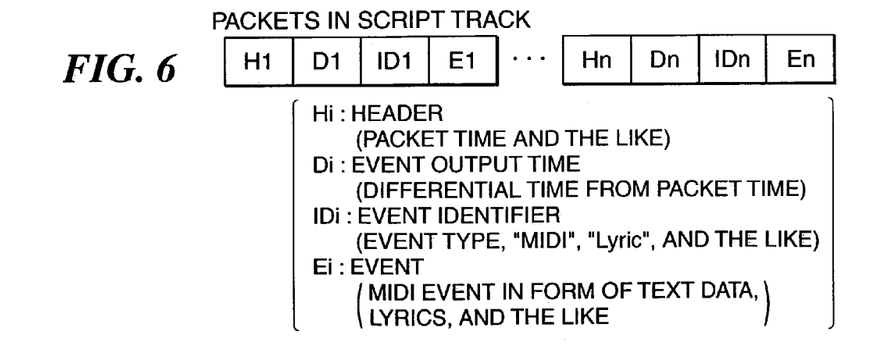
FIG. 6 is a view showing the data structure of packet data in a script track.

FIG. 6 shows the detailed structure of the script data section (Si) of the multimedia encoded data in FIG. 4, i.e. packet data (script data) in the script track. In the figure, the video data (Vi) and audio data (Ai) in each packet are omitted.

As shown in FIG. 6, packet data in the script track is composed of a header section (Hi) containing a packet time and other information, event output time information (Di) indicative of the time at which an event is output, in terms of a differential time from the packet time point, an event identifier (IDi) indicative of the type of the event, and event information (Ei). In the illustrated example, the event identifier (IDi) contains characters such as "MIDI", which is indicative of a MIDI event, or "Lyric", which is indicative of lyric data. The event information (Ei) contains MIDI event in the form of text data or lyric data.

Figure 7A:
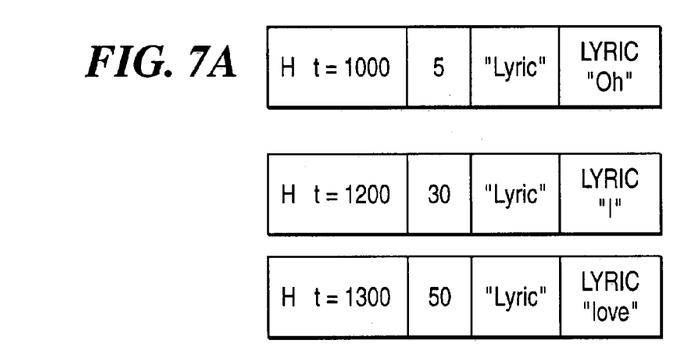
FIG. 7A is a view showing an example of existing script packets of packet data in a script track.
Figure 7B:
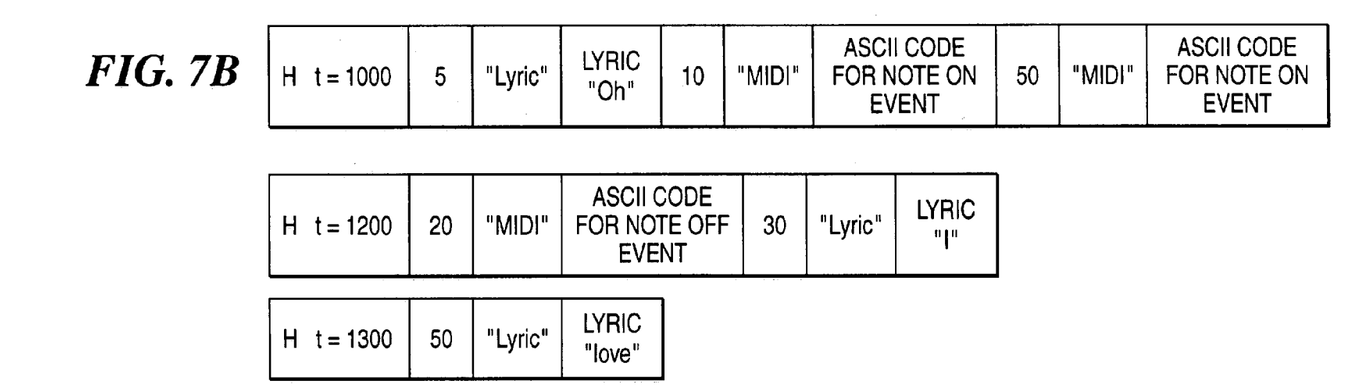
FIG. 7B is a view showing an example of script packets in which MIDI data is stored.

Packet data in the script track will be specifically described with reference to FIGS. 7A and 7B. FIG. 7A shows an example of already existing script packets. It is assumed that lyric information is stored in these packets. MIDI events in the SMF shown in FIG. 5B are stored in these script packets to create script packets as shown in FIG. 7B. Here, it is assumed that 1 packet time is 100 milliseconds and that information (event output time information) on a differential time from the packet time point is stored in each script packet.

The SMF shown in FIG. 5B indicates that a note-on event occurs 1010 milliseconds after the start of performance, another note-on event occurs 1050 milliseconds after the performance start, and a note-off event occurs 1220 milliseconds after the performance start. Further, the existing script packets shown in FIG. 7A include a packet with a packet time point t=1000 milliseconds in which lyric information "Oh", which is displayed 1005 milliseconds after the performance start, is contained, a packet with a packet time point t=1200 milliseconds in which lyric information "I", which is displayed 1230 milliseconds after the performance start, is contained, and a packet with a packet time point t=1300 milliseconds in which lyric information "love", which is displayed 1350 milliseconds after the performance start, is contained.

Then, MIDI events are inserted into script packets to be reproduced in corresponding timings to create new script packets into which performance information is thus inserted. At this time, as described previously, the MIDI events contained in the SMF as binary data are converted into text codes such as ASCII codes, and differential time information is created. The text codes and the differential time information are stored in the script packets.

As shown in FIG. 7B, the packet with t=1000 milliseconds has an area containing the lyric information "Oh" with the event output time=5, an area containing the MIDI event (note on) with the event output time=10, and an area containing the MIDI event (note on) with the event output time=50. The packet with t=1200 milliseconds has an area containing the MIDI event (note off) with the event output time=20, and an area containing the lyric information "I" with the event output time=30. In the illustrated example, each of the MIDI events is stored after being converted into ASCII codes. That is, the event identifier "MIDI", which is indicative of a MIDI event, is stored in an ASCII code ("4D494449(H)"). Further, while the note-on event with the event output time=10 is stored in a code "90607, F(H)" in the SMF data shown in FIG. 5B, in the corresponding script packet in FIG. 7B, it is stored in the corresponding ASCII code ("39 30 36 30 37 46(H)"). Similarly, the note-on event ("906C4(H)") with the event output time=50 is stored in an ASCII code ("39 30 36 43 36 34(H)") and the note-off event ("80607F(H)") with the event output time=20 in the packet with t=1200 milliseconds is stored in an ASCII code ("38 30 36 30 37 46(H)").

Figure 8:
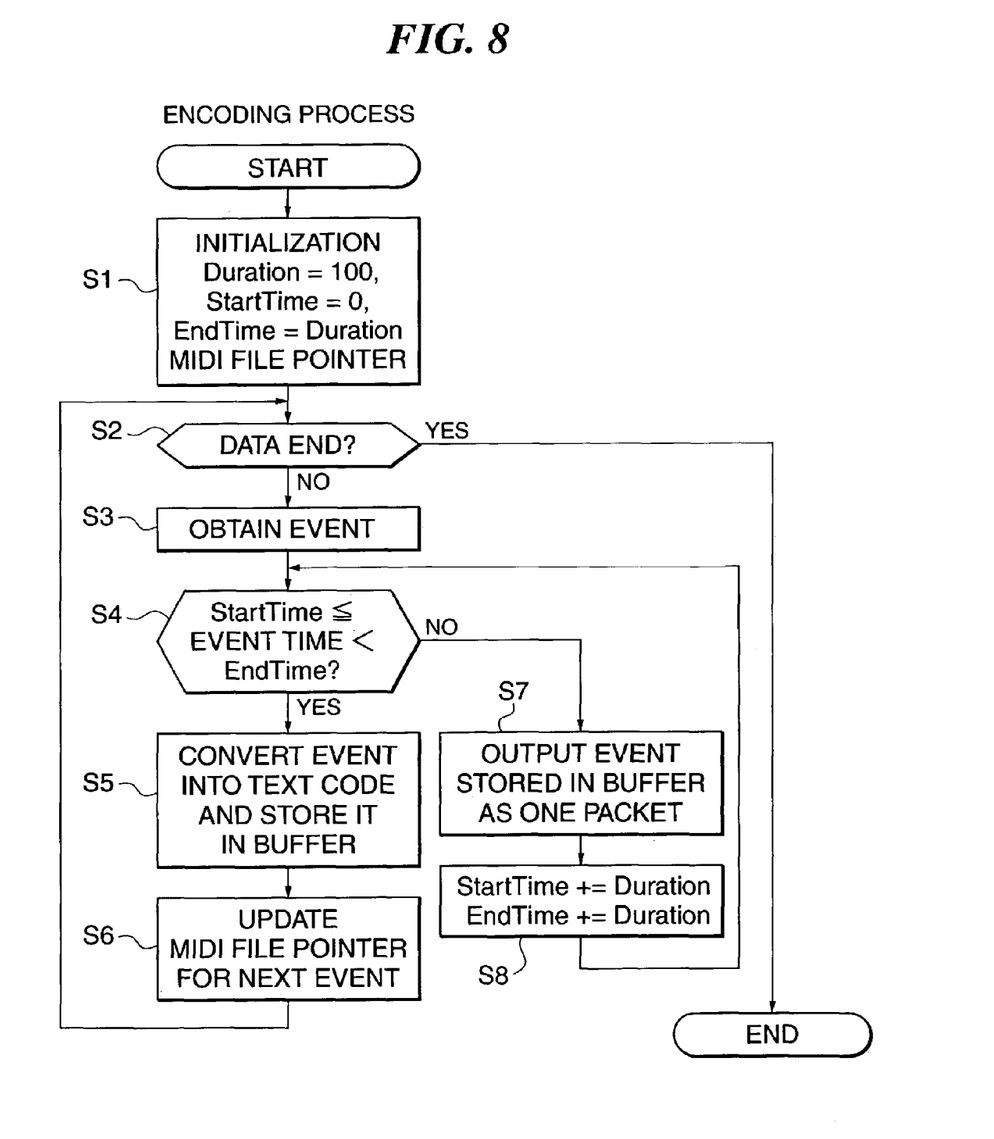
FIG. 8 is a flow chart showing an encoding process of converting MIDI data into text data.

FIG. 8 is a flow chart showing an encoding process of converting MIDI data into text data as described above.

When the process is started, initialization is first carried out (S1). In the initialization, if a multimedia packet into which the SMF is to be converted has a packet time of 100 milliseconds, then 100 is set to avariable Duration, 0 is set to a variable StartTime, and the Duration value (100) is set to a variable EndTime. Further, a MIDI file pointer indicative of a position of the SMF (MIDI file) to be read is set to the leading position of the packet.

Then, an event is obtained from the MIDI file (step S3). It is then determined whether or not the event time point calculated from the duration data (Di) is later than the StartTime and earlier than the EndTime, i.e. whether or not the event time point belongs to the packet time of this script packet (step S4). If the event time point belongs to the packet time, the event is converted into text data (text code) as described above. Differential time information is determined which corresponds to the difference between the event time point and the start time point (=StartTime) of the packet. Then, the differential time information and the text code corresponding to the event are written to a buffer (step S5). Then, the MIDI file pointer is updated for the next event (step S6) to obtain the next event (step S3). If the event time point does not belong to the packet time, the differential time information stored in the buffer and the text code corresponding to the event are output as one packet (step S7). The variables StartTime and EndTime are increased by the value of the variable Duration (=100) so as to correspond to the next packet time (step S8). The process returns to the step S4 of determining whether or not the resulting time point belongs to the updated packet time. The above process is repeated until all the data in the MIDI file is processed (step S2).

The above process enables the MIDI file (SMF) to be converted into a multimedia packet format in which the MIDI file is divided into packets per packet time. The packets thus obtained by encoding the MIDI file are input to the embedder together with video packets, audio packets, and script packets. Then, the embedder synthesizes the packets to generate multimedia encoded data.

Now, a description will be given of a process of reproducing multimedia information by decoding such multimedia encoded data.

Figure 9:
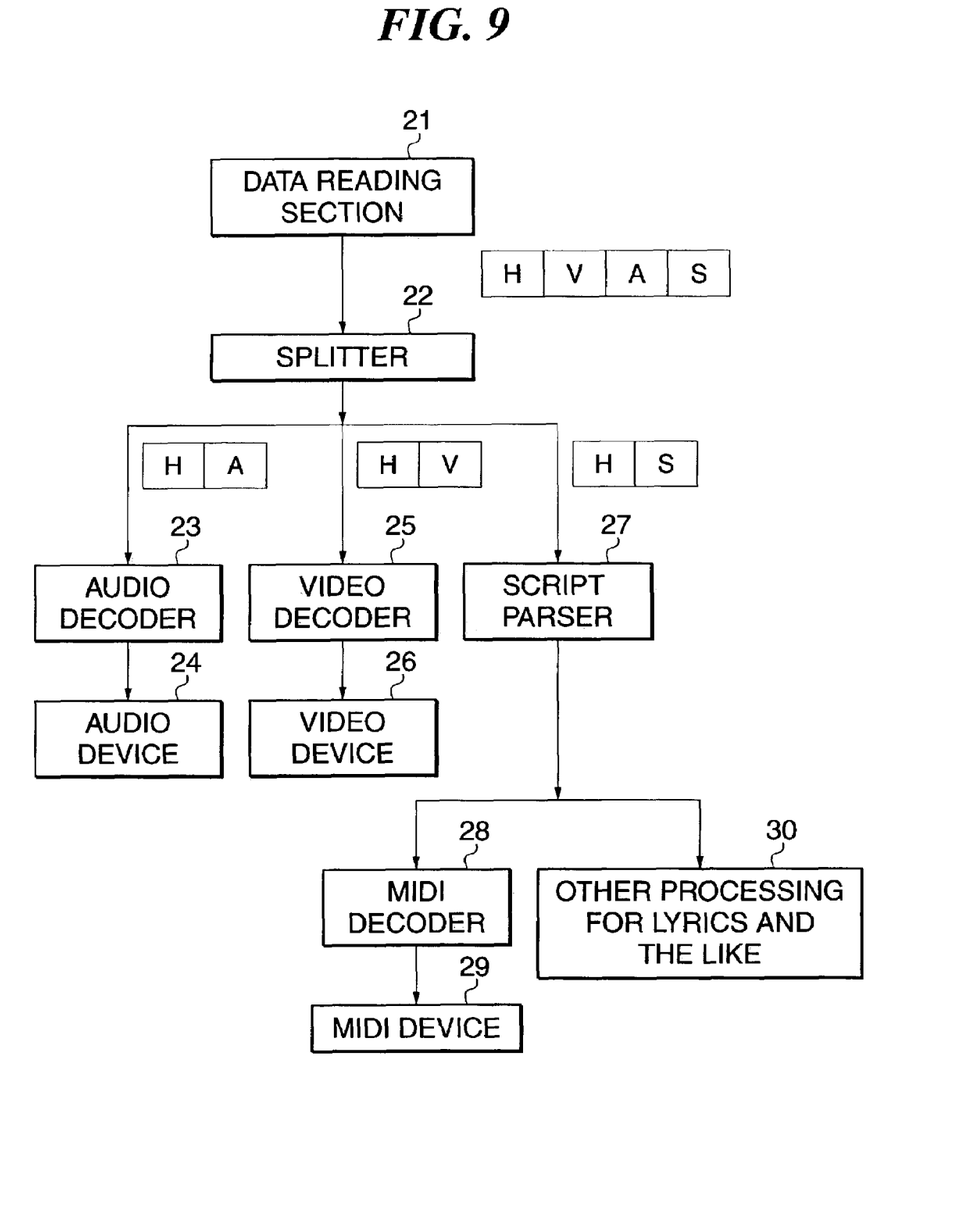
FIG. 9 is a functional block diagram showing a data stream of multimedia packets.

FIG. 9 is a functional block showing the flow of a data stream of multimedia packets.

In the figure, a data reading section 21 reads in multimedia encoded data with reference to file paths or URLs, and delivers the read multimedia encoded data to a splitter 22 as packets. The splitter 22 separates each of the received packets into data for the audio track, data for the video track, and data for the script track. The splitter 22 delivers the data for the audio track to an audio decoder 23, the data for the video track to a video decoder 25, and the data for the script track to a script parser (script analysis section) 27.

The audio decoder 23 expands the data for the audio track and outputs the expanded data to an audio device 24 in timing for the corresponding packet. The video decoder 25 expands the data for the video track and outputs the expanded data to a video device 26 in timing for the corresponding packet.

The script analysis section (script parser) 27 analyzes the data for the script track and supplies event information with the event identifier "MIDI" to a MIDI decoder 28 and supplies event information with another identifier such as "Lyric" or "URL" to a process section 30 with. The MIDI decoder 28 has a function of converting event information with the "MIDI" event identifier from an ASCII code into hexadecimal information as well as a sequencer function. The MIDI decoder 28 thus converts the event information into corresponding MIDI data (binary data). When the MIDI data contains differential time information, the MIDI decoder 28 outputs the MIDI data to a MIDI device 29 in timing corresponding to the sum of the differential time information and the packet time point of the packet. This allows the MIDI device such as a MIDI musical instrument or a tone generator to generate and output musical tones. Alternatively, software may be used to generate musical tones.

Figure 10:
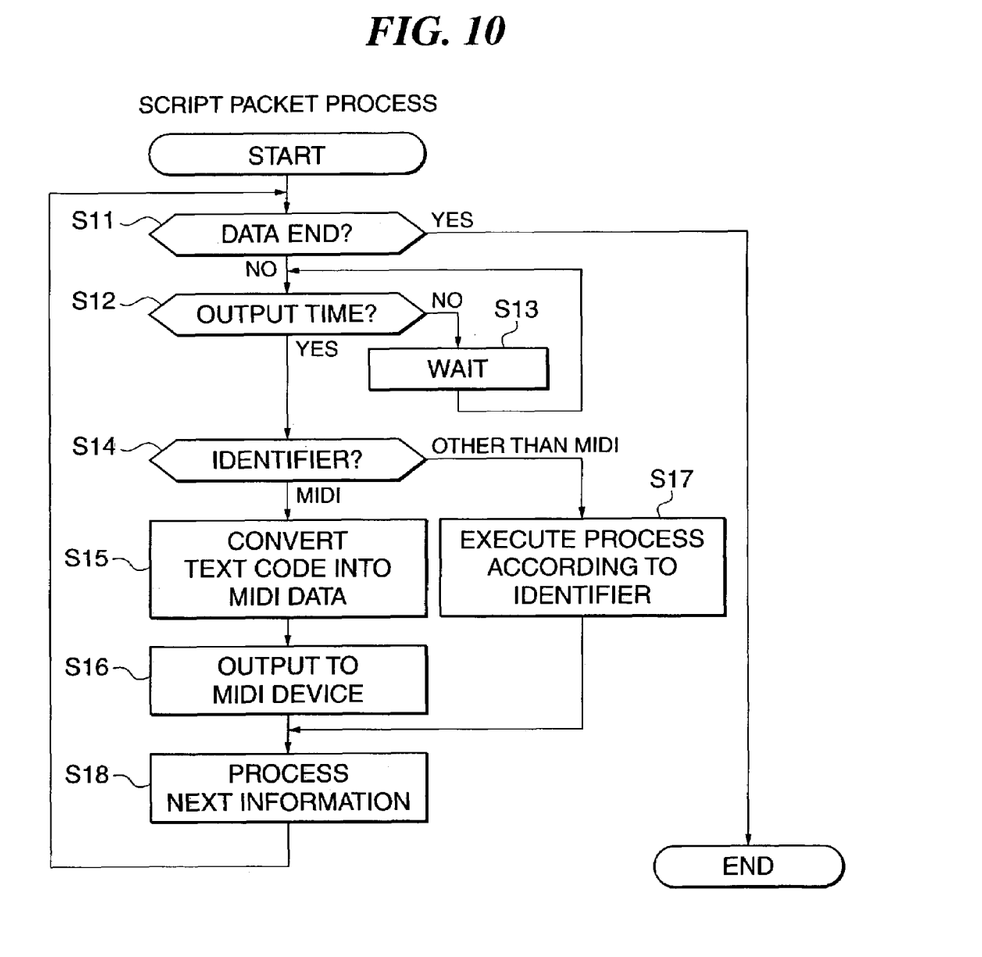
FIG. 10 is a flow chart showing a script packet process.

A description will be given of a script packet process executed by the script parser 27, the MIDI decoder 28, and another processing section 30 with reference to the flow chart of FIG. 10.

When a packet of the script track is input by the splitter 22, a process described below is executed until the end of the data is reached (step S11). First, it is determined whether or not the current time point reaches the time point at which the event is to be output, based on the timing information (packet time point) recorded in the header section of the packet and the event output time (differential time information) recorded correspondingly to each event. If the output time point is reached (Yes at a step S12), the corresponding event identifier is determined (S14). If the event identifier is the "MIDI", the event recorded as a text code (ASCII code) is converted into MIDI data (hexadecimal code) (step S15). This MIDI data is then output to the MIDI device 29 (step S16). If the event identifier is the "Lyric" or the like, a corresponding output process is executed (step S17). For example, when the event identifier is the "Lyric", that event (lyric information to be displayed) is output to an image display section. Then, the next information is processed (step S18).

In this manner, the process corresponding to each event is executed in predetermined timing to reproduce multimedia information.

It goes without saying that the present invention may be achieved by supplying a system or an apparatus with a program code of software that realizes the functions of the above described embodiment, and causing a computer (or CPU or MPU) of the system or apparatus to read out and execute the supplied program code. In this case, the program code itself read out from a storage medium realizes the functions of the above described embodiment, so that the storage medium storing the program code also constitutes the present invention. The storage medium for supplying the program code may be selected from, for example, a floppy disk (registered trade mark), hard disk, optical disk, magneto-optical disk, CD-ROM, CD-R, CD-RW, DVD-ROM, DVD-RAM, DVD-RW, DVD+RW, magnetic tape, non-volatile memory card, ROM and downloading via a network.

As described above, according to the present invention, MIDI data is converted into text codes and stored in the script track that can be output and displayed in synchronism with audio data and video data. Thus, a reproducer can output the MIDI data in synchronism with the audio data.

What is claimed is

1. A multimedia information encoding apparatus, comprising:
 a first receiver that receives performance information including information of a sequence of musical performance events on musical tone generation;
 a second receiver that receives media information, the media information including a sequence of data packets, each of the data packets being configured to be reproduced in synchronism with information on any of the musical performance events included in the performance information, and having a header section that contains time information defining a reproduction timing for each of the data packets and a data section that contains event data;

a first converter that converts information of a certain musical performance event included in the received performance information into text codes; and a creator that inserts the converted text codes into a data section in a data packet to be reproduced in synchronism with the information of the certain musical performance event, and creates multimedia encoded data based on the data packet having the data section into which the converted text codes have been inserted.

2. A multimedia information encoding apparatus according to claim 1, wherein the performance information includes MIDI information.

3. A multimedia information encoding apparatus according to claim 1, wherein said creator creates multimedia encoded data including a sequence of script packets based on the data packets having the data section into which the converted text codes have been inserted, and wherein each of the script packets includes an identifier indicative of information of each musical performance event.

4. A multimedia information encoding apparatus according to claim 1, wherein said creator creates multimedia encoded data including a sequences of script packets based on data packets having data sections into which the converted text codes have been inserted, wherein each of the script packets includes the converted text codes, and wherein the multimedia information encoding apparatus further comprises:

a detector that detects the converted text codes from each of the script packets;

a second converter that converts the detected text codes into the performance information; and a musical tone generator that generates musical tones based on the converted performance information.

5. A multimedia information encoding apparatus according to claim 1, wherein the data section contains at least one of event information on audio information, event information on video information and information on lyrics as the information of musical performance event.

6. A multimedia information encoding apparatus according to claim 1, wherein when converting the information of the certain musical performance event into the text codes, said first converter generates information on differential time between the data packet having the data section into which the converted text codes have been inserted a performance event corresponding to the data packet, and wherein said creator creates multimedia encoded data having information indicative of the differential time.

7. A multimedia information encoding method, comprising the steps of:

receiving performance information including information of a sequence of musical performance events on musical tone generation;

receiving media information which includes a sequence of data packets, each of the data packets being to be reproduced in synchronism with information of any of the musical performance events included in the performance information and having a header section that contains time information defining a reproduction timing for each of the data packets and a data section that contains event data;

converting information of a certain musical performance event included in the received performance information into text codes;

inserting the converted text codes into the data section of the data packet to be reproduced in synchronism with the information of the certain musical performance event; and creating multimedia encoded data based on the data packet having the data section into which the converted text codes have been inserted.

8. A multimedia information encoding method according to claim 7, wherein in the step of creating certain multimedia encoded data, the multimedia encoded data including a sequence of script packets is created based on the data packets having the data section into which the converted text codes have been inserted, wherein each of the script packets includes the converted text codes, and wherein the multimedia information encoding method further comprises the steps of:

detecting the converted text codes in each of the script packets;

converting the detected text codes into the information of the certain musical performance event; and generating musical tones based on the converted information of the certain musical performance event.

* * * * *